United States Patent
Myjak et al.

(10) Patent No.: US 7,928,399 B2
(45) Date of Patent: Apr. 19, 2011

(54) METHOD AND SYSTEM FOR IMAGING A RADIATION SOURCE

(75) Inventors: Mitchell J. Myjak, Richland, WA (US); Carolyn E. Seifert, Kennewick, WA (US); Scott J. Morris, Kennewick, WA (US)

(73) Assignee: Battelle Memorial Institute, Richland, WA (US)

( * ) Notice: Subject to any disclaimer, the term of this patent is extended or adjusted under 35 U.S.C. 154(b) by 49 days.

(21) Appl. No.: 12/518,964

(22) PCT Filed: Dec. 18, 2007

(86) PCT No.: PCT/US2007/087877
§ 371 (c)(1),
(2), (4) Date: Jun. 12, 2009

(87) PCT Pub. No.: WO2008/077011
PCT Pub. Date: Jun. 26, 2008

(65) Prior Publication Data
US 2010/0078571 A1    Apr. 1, 2010

Related U.S. Application Data

(60) Provisional application No. 60/870,651, filed on Dec. 19, 2006.

(51) Int. Cl.
*H01L 27/146* (2006.01)
(52) U.S. Cl. .................................. 250/370.08
(58) Field of Classification Search ......... 250/370.01–370.15; 378/98.8
See application file for complete search history.

(56) References Cited

U.S. PATENT DOCUMENTS

| | | | |
|---|---|---|---|
| 6,484,051 B1 * | 11/2002 | Daniel | 600/436 |
| 2002/0008205 A1 | 1/2002 | Kurfess et al. | |
| 2006/0208195 A1 * | 9/2006 | Petrick et al. | 250/370.09 |
| 2007/0145278 A1 * | 6/2007 | Gunter | 250/363.03 |

FOREIGN PATENT DOCUMENTS

WO    2008/077011 A2    6/2008

OTHER PUBLICATIONS

Nurdan et al., "Development of a Compton camera data acquisition system using FPGAs", Presented to at ISPC 2003.*
Oonuki et al., "Results of a Si/CdTe Compton Telescope", 2005, SPIE Conference on Optics and Photonics.*
T. Nurdan et al., "Silicon drift detector readout electronics for a compton camera," 2004, Nuclear Instrumentations and Methods in Physics Research A, vol. 523, pp. 435-440.*

(Continued)

*Primary Examiner* — David P Porta
*Assistant Examiner* — Kiho Kim
(74) *Attorney, Agent, or Firm* — Derek H. Maughan

(57) ABSTRACT

A method for imaging a radiation source, and a device that utilizes these methods that in one embodiment include the steps of: calculating at least one Compton cone of a first parameter of a radiation emission from information received from a sensor occurrence; and tracing this Compton cone on to a unit sphere having preselected characteristics using an estimated angular uncertainty to limit at least a portion of said tracing. In another embodiment of the invention at least two Compton cones are calculated and then intersected upon a predefined surface such as a sphere. These intersection points can then be iterated over a preselected series of prior events.

12 Claims, 3 Drawing Sheets

OTHER PUBLICATIONS

Lehner, Carolyn E. et al., 4π Compton Imaging Using a 3-D Position-Sensitive CdZnTe Detector Via Weighted List-Mode Maximum Likelihood, IEEE Transactions on Nuclear Science, vol. 51, No. 4, Aug. 2004.

Lackie, Adam W. et al., A Directional Algorithm for an Electronically-collimated Gamma-ray Detector, 2006 IEEE Nuclear Science Symposium Conference Record, vol. 1, Oct. 2006.

Smith, Blair, et al., An Electronically-collimated Gamma-ray Detector for Localization of Radiation Sources, 2006 IEEE Nuclear Science Symposium Conference Record, vol. 1, Oct. 2006.

Wilderman, Scott J. et al., Fast Algorithm for List Mode Back-Projection of Compton Scatter Camera Data, IEEE Transactions on Nuclear Science, vol. 45, No. 3, Jun. 1998.

Cunningham, Mark, et al., First-Generation Hybrid Compact Compton Imager, 2005 IEEE Nuclear Science Symposium Conference Record, vol. 1, Oct. 2005.

Lehner, Carolyn E., et al., Image Artifacts Resulting from Gamma-Ray Tracking Algorithms Used with Compton Imagers, 2004 IEEE Nuclear Science Symposium Conference Record, vol. 3, Oct. 2004.

Zhang, Feng, et al., Improved Resolution for 3-D Position Sensitive CdZnTe Spectrometers, IEEE Transactions on Nuclear Science, vol. 51, No. 5, Oct. 2004.

PCT International Search Report and Written Opinion, Jun. 19, 2009.

* cited by examiner

METHOD AND SYSTEM FOR IMAGING A RADIATION SOURCE

PRIORITY

This invention claims priority from a provisional patent application entitled Implementation of Image and Energy Calculations for CZT based Radiation Detector filed Dec. 19, 2006, Application No. 60/670,651, the contents of which are hereby incorporated by reference.

STATEMENT AS TO RIGHTS TO INVENTIONS MADE UNDER FEDERALLY-SPONSORED RESEARCH AND DEVELOPMENT

This invention was made with Government support under Contract DE-AC0576RLO1830 awarded by the U.S. Department of Energy. The Government has certain rights in the invention.

BACKGROUND OF THE INVENTION

1. Field of the Invention

This invention generally relates to radiation sensing and more particularly to methods and systems for imaging a radiation source.

2. Background Information

In the field of radiation sensing, a need exists for devices that allow for the improved detection, location and characterization of various suspected radiation emitting sources. While various methods and devices have been created to attempt to accomplish these tasks, various problems related to these prior art methods have limited the functionality, versatility, reliability, and implementation of such methods and the use of particular devices for various types of applications. The present invention is a new method and system that overcomes these prior art problems and provides a method that, for example, reduces data processing, energy, and space requirements for a variety of functions including detecting, imaging, and characterizing a radiation source, distinguishing between multiple radiation sources, mapping these sources, and screening potential sources. The present invention thus provides attractive features for portable, mobile, or remote operation applications.

Additional advantages and novel features of the present invention will be set forth as follows and will be readily apparent from the descriptions and demonstrations set forth herein. Accordingly, the following descriptions of the present invention should be seen as illustrative of the invention and not as limiting in any way.

SUMMARY

The present invention includes improved methods for imaging a radiation source, and a device that utilizes such methods. In one embodiment of the invention the method includes the steps of: calculating at least one Compton cone of a first parameter of a radiation emission from information received from a sensor occurrence; and tracing this Compton cone on to a unit sphere having preselected characteristics using an estimated angular uncertainty to limit at least a portion of said tracing. In another embodiment of the invention at least two Compton cones are calculated and then intersected upon a predefined surface such as a sphere. These intersection points can then be iterated over a preselected series of prior events. Various implementations, modifications and alterations of these methods are contemplated within the scope of the attached claims and are set forth in part in the detailed description of the preferred embodiments of the invention which is described hereinafter. In one embodiment the method is deployed inside of a device (for example, a small lightweight handheld device) that has a FPGA (field programmable field array) arrangement that performs the steps of the previously described methods.

The method, system and arrangement of the present invention allows for the creation of devices that are capable of providing ready results in a timely fashion with decreased energy consumption. These devices may also typically occupy less space and provide faster results than other devices that are currently known. This allows for highly efficient portable, mobile, or remotely-operated radiation detectors that may be used in a variety of applications including nuclear security, medicine, astronomy, physics and other scientific research, as well as in nuclear safety and other applications depending upon the exact desires and necessities of the user. Therefore the embodiments and disclosures of this application should be seen as illustrative and not limiting in any way.

The purpose of the foregoing abstract is to enable the United States Patent and Trademark Office and the public generally, especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Various advantages and novel features of the present invention are described herein and will become further readily apparent to those skilled in this art from the following detailed description. In the preceding and following descriptions we have shown and described only the preferred embodiment of the invention, by way of illustration of the best mode contemplated for carrying out the invention. As will be realized, the invention is capable of modification in various respects without departing from the invention. Accordingly, the drawings and description of the preferred embodiment set forth hereafter are to be regarded as illustrative in nature, and not as restrictive.

DETAILED DESCRIPTION OF THE INVENTION

The following description includes the preferred best mode of one embodiment of the present invention. It will be clear from this description that the invention is not limited to these illustrated embodiments but that the invention also includes a variety of modifications and embodiments thereto. Therefore, the present description of the preferred embodiments of the invention should be seen as illustrative and not as limiting. While the invention is susceptible to various modifications and alternative constructions, it should be understood that there is no intention to limit the invention to the specific form disclosed, but, on the contrary, the invention is to cover all modifications, alternative constructions, and equivalents falling within the spirit and scope of the invention as defined in the claims.

The present invention is a method for imaging a radiation source, to determine various features such as location, direction and/or characterization of that source. In one preferred embodiment of the invention the methods which are utilized to interpret data and characterize this data are incorporated within a handheld radiation identifier device. In addition to isotope identification, the device performs basic Compton imaging in accordance with the present method to determine the location of radiation sources. In a first embodiment, individual Compton cones are projected onto a unit sphere, while in a second embodiment the intersection of two Compton cones and the unit sphere are calculated. Simulations demonstrate that these methods are suitable for determining the directionality, even with features such as uncertainty calculations omitted. The one-cone method generally works more efficiently at high count rates, and the two-cone method generally causes fewer artifacts. While these particular descriptions related to the implementation of these methods have been provided, it is to be distinctly understood that the invention is not limited to the particular embodiments or implementations set forth in this description of the preferred embodiment.

The methods described in this preferred description may be implemented by any type of device or configuration but in this description of the preferred embodiment are implemented within an arrangement that includes an FPGA (field programmable gate array) because these types of devices typically offer better performance than microprocessors for signal processing applications. In addition, the methods and algorithms that are utilized rely on basic functions such as addition and multiplication as much as possible in order to reduce power consumption. Some steps may be parallelized in order to further reduce power consumption. Depending upon the needs and necessities of the user, either or both of the methods described in the present application may be utilized with or without the FPGA to achieve the desired results.

Figure 1:
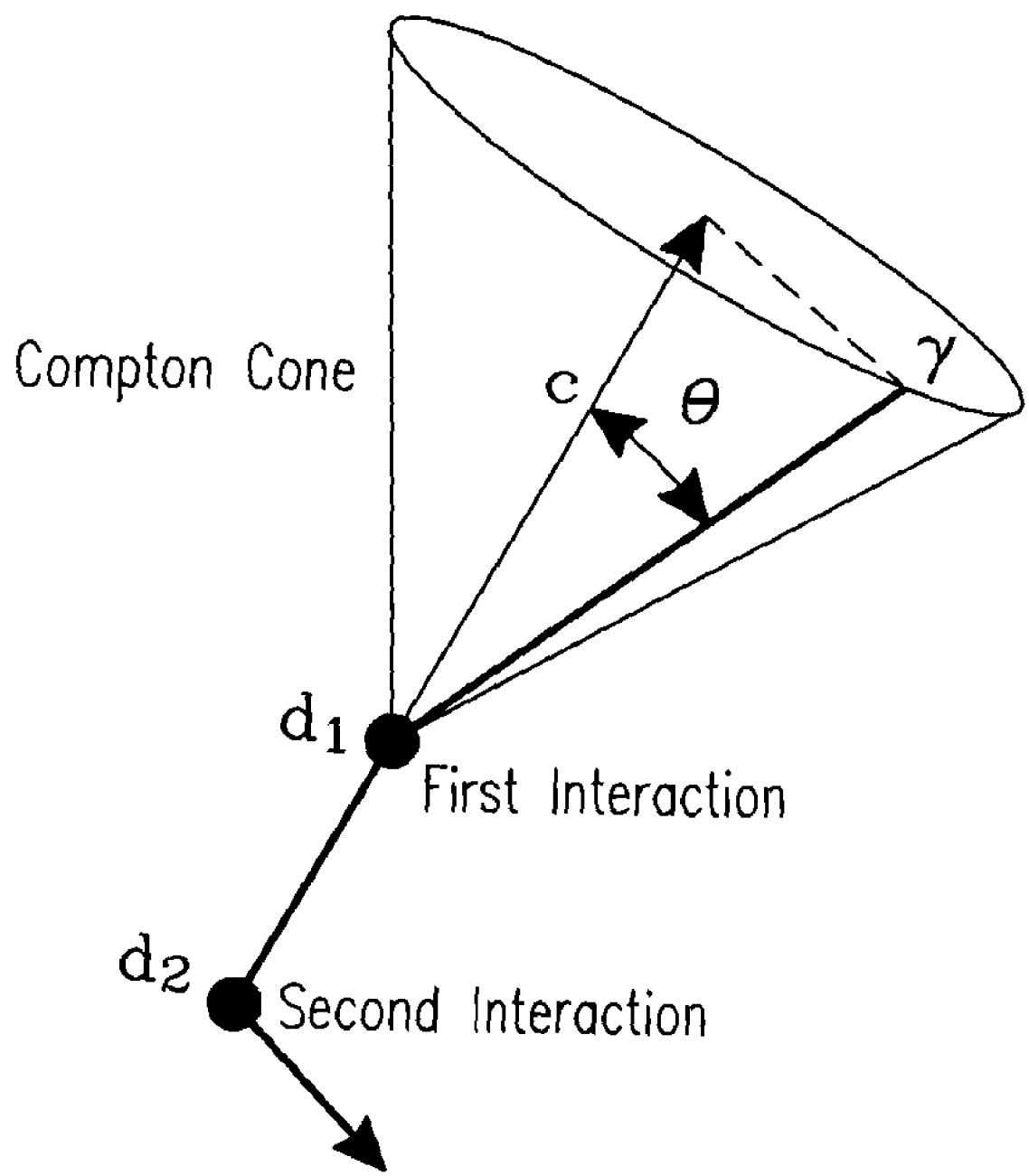
FIG. 1 is a view of a single Compton imaging cone.

Referring now to FIG. 1, a representation of a gamma ray $\gamma$ interacting with a detector is shown. The gamma ray generally undergoes a sequence of interactions i=1, 2, ..., n in which it deposits energy $E_i$ at location $d_i=(d_{ix}, d_{iy}, d_{iz})$. If all events are captured inside the detector, the incident energy $E_0$ equals the sum of the deposited energies. In a typical embodiment the deflection angle $\theta$ for the first interaction can be computed using the Compton scatter formula $$\cos\theta = 1 - \frac{m_e c^2 E_1}{E_0(E_0 - E_1)},$$

where $m_e c^2 = 511.00$ keV is the rest mass energy of an electron. Although the incident direction of the gamma ray cannot be measured directly, it generally falls on a cone with opening angle $\theta$ and normalized axis direction $$c = \frac{d_1 - d_2}{\|d_1 - d_2\|}.$$

In a typical embodiment each Compton cone is typically expected to have different values for c and $\theta$. By intersecting the cones for multiple gamma rays the probable location of the radiation source is revealed. Furthermore, many applications do not require the distance between the detector and the source to be computed. In this case, any or all of the Compton cones can be projected onto a two or three dimensional surface, such as a plane or a sphere, to create an image. The resulting image can be processed to estimate the direction to the radiation source but typically contains no depth information. Computationally, this method is much simpler than intersecting arbitrary cones in three dimensions. However, modifications to this method have also been developed which provide additional advantages.

In order to perform the imaging method described above some processing of the raw energy and position data from each gamma-ray event that is identified may be required. First, the true energies and positions of the interactions in the detector array should be determined. Then, the correct sequence of events is typically established. In the preferred embodiment of the invention, the gamma rays interact with one or more solid detectors, each of which features a common cathode and pixelated anode. While this particular embodiment is set forth and described it is to be distinctly understood that the invention is not limited thereto but may be variously employed with a variety of other types of detectors including positron sensitive detectors such as double sided strip detectors, and arrays of standard types of detectors. The front-end electronics provide four values for each interaction i within the detectors: the anode charge amplitude $A_i$ the anode pixel coordinates $(d_{ix}, d_{iy})$, and the time difference $\tau_i$ between the anode and cathode pulses. The depth of the event $d_{iz}$ is roughly proportional to the time difference $\tau_i$. To account for second-order effects, it is assumed that $d_{iz}$ generally follows a piecewise linear approximation which can be described as: $d_{iz} = \alpha_z \tau_i + \beta_z$, $\tau_{low} \leq \tau_i \leq \tau_{high}$, where $\alpha_z$ and $\beta_z$ are the gain and offset of the line segment. Likewise, it is assumed that the deposited energy $E_i$ generally follows $E_i = \chi_E(\alpha_E A_i + \beta_E)$, $A_{low} \leq A_i \leq A_{high}$, where $\alpha_E$ and $\beta_E$ are as before, and $\chi_E$ is an adjustment for crosstalk between multiple events. These piecewise linear corrections encompass a wide range of effects, including material variations, geometric asymmetries, and so forth. Parameters $\alpha_z$ and $\beta_z$ are functions of the pixel coordinates $(d_{ix}, d_{iy})$. Parameters $\alpha_E$ and $\beta_E$ depend on the three-dimensional event location $(d_{ix}, d_{iy}, d_{iz})$ and the current temperature. Finally, parameter $\chi_E$ depends on the depth $d_{iz}$ and the distance between multiple interactions.

In some embodiments of the invention the parameters are calibrated against known standards. To simplify the calibration process, the system divides the z-axis into a number of virtual layers. The system then stores $\alpha_z$ and $\beta_z$ for each pixel and time interval, $\alpha_E$ and $\beta_E$ for each pixel, virtual layer, and amplitude interval, and $\chi_E$ for each virtual layer and approximate distance between multiple interactions. Since the temperature changes relatively slowly, the system can adjust $\alpha_E$ and $\beta_E$ as necessary. Once the energy of each interaction has been determined, and the incident energy $E_0$ estimated, windowing techniques may be applied to select gamma rays of certain energies. For example, the operator might want to mask a natural radiation source to search for other, hidden threats.

In embodiments where the front-end electronics do not have sufficient timing resolution to capture individual events as they occur within the detector, the imaging method takes the list of interactions reported by the electronics and arranges them in time order. There are a variety of heuristics for performing this task. For two interactions, the most popular technique uses energy information alone to determine the most likely sequence order. For three or more interactions, one approach starts with an assumption about the final interaction and reconstructs the track backwards. An alternative method uses Compton kinematics to reject non-physical sequences and calculates the probability of observing the remaining sequences. Yet another approach applies Bayesian methods to compare a given sequence order against a multi-dimensional simulated dataset. Finally, the actual scatter angles are compared with the angle predicted from the Compton scatter formula. In addition to these techniques other techniques may also be utilized to reconstruct sequences of two or more interactions.

In this preferred embodiment of the invention, when there are two interactions, the method includes the step of comparing deposited energies to determine which event comes first. If the incident energy $E_0$ is less than a certain threshold $E_t$, the events are ordered so that $E_1 < E_2$. Otherwise, the method takes $E_1 > E_2$. This empirical technique is consistent with observations that gamma rays that deposit most of their energy in the initial scatter are more likely to be absorbed in the second interaction. Thus the optimal value of $E_t$ can be derived via a simulation package such as GEANT4. In one embodiment of the invention, $E_t$ is approximately 400 keV for a single 2.25-$cm^3$ CdZnTe crystal.

In those instances where there are three interactions, the method takes each permutation of the three interactions and examines the deflection angle $\phi$ of the second interaction. The value of cos $\phi$ calculated from the Compton scatter formula, $$\cos\phi_E = 1 - \frac{m_e c^2 E_2}{(E_2 + E_3)E_3},$$

is compared to the value of cos $\phi$ calculated from the event locations within the detector, $$\cos\phi_d = \frac{d_3 - d_2}{\|d_3 - d_2\|} \cdot \frac{d_2 - d_1}{\|d_2 - d_1\|}.$$

Permutations that produce invalid values for the cosines are discarded. Finally, the permutation that minimizes the absolute difference $\sigma = |\cos \phi_E - \cos \phi_d|$ is selected. One could also compute the uncertainties in energy in position and refine the metric to reflect those values.

In those instances where there are more than three interactions, the method could use the same technique to check every permutation of three events and piece together the most likely sequence. However, this method involves significant computational effort, and the results become less reliable as n increases. Simulations of the 18-crystal array with a 662-keV source indicate that only 9.4% of the sequences contain four or more events. Hence, this method is not employed in the preferred embodiment, but still may be considered and utilized within the scope of the claims of the present invention.

The imaging methods of the present invention project Compton cones onto a sphere of unit radius. This approach is particularly useful when used in conjunction with three-dimensional position-sensitive detectors. The technique is sometimes referred to as "$4\pi$ Compton imaging" since a source at any angle (within all of $4\pi$ steradians) relative to the detector can be reconstructed. The following discussion summarizes the first method which traces individual cones onto the sphere. An estimated angular uncertainty determines the width of the trace.

The objective of the one-cone method is to trace individual Compton cones onto the unit sphere. The result of the projection of the Compton cone onto the unit sphere is simply a circle. The method of the present invention includes computing the cone axis direction c and opening angle $\theta$ as described previously.

Figure 2:
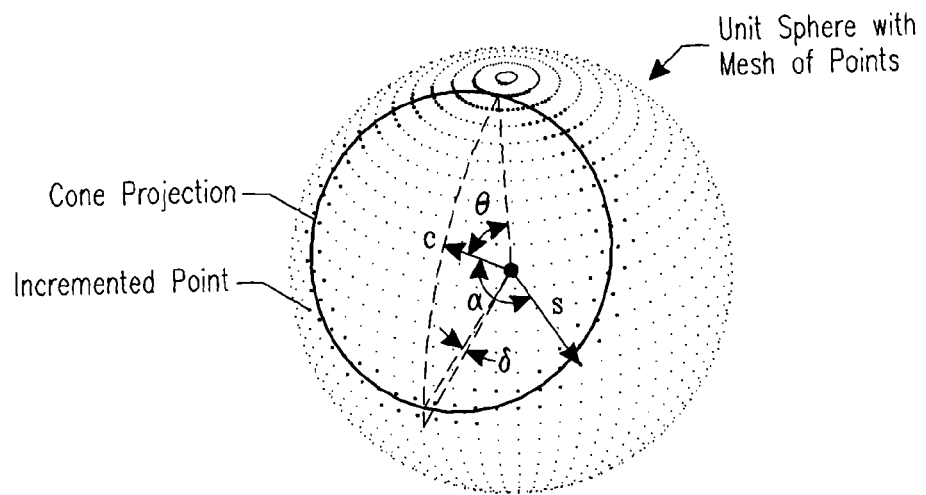
FIG. 2 is a view of the method of the present invention wherein a Compton cone is imaged upon a sphere.

Referring now to FIG. 2, let s be the direction vector from the origin to an arbitrary point on the sphere, and let $\alpha$ be the angle between c and s. Since c and s are unit vectors, cos $\alpha = c \cdot s$. The circle can be described as the set of points for which $\alpha = \theta$. To create the image the sphere is divided into a mesh of r points. The cone is then traced onto the image by finding all points on the mesh for which $\theta - \delta \leq \alpha \leq \theta + \delta$. The difference angle $\delta$ compensates for the fact that points on the mesh will not always coincide with the projection in general. While this value could be related to the uncertainties in energy and position, in this embodiment of the invention $\delta$ is set to a constant that is proportional to the angle between adjacent points on the mesh. In the preferred embodiment, implementing the cos $\alpha = c \cdot s$ directly is not computationally efficient on an FPGA since only the cosines of $\alpha$ and $\theta$ are known. However, it can be assumed without loss of generality that $\alpha$ and $\theta$ fall within the range [0, $\pi$]. The value of $\delta$ can also be limited to the range [0$\pi$/2] without imposing undue restrictions on the imaging algorithm. Simplifying these interrelationships produces the equation $$\{c \cdot s \leq \cos \theta \cos \delta + \sin \theta \sin \delta \text{ OR } \cos \theta \geq \cos \delta\} \text{ AND}$$
$$\{c \cdot s \geq \cos \theta \cos \delta - \sin \theta \sin \delta \text{ OR } \cos \theta \leq -\cos \delta\}$$

which can then be evaluated for each point on the mesh.

Each point on the mesh is associated with a value that is initially set to zero. In this preferred embodiment, the direction histogram is updated by incrementing by one the values corresponding to the points that satisfy the conditions set forth above. In an alternative embodiment, said values are incremented by a factor 1/k, where k is the total number of points that meet said conditions. This normalization would ensure that all Compton cones contribute equally to the direction histogram in summation. In addition, in other embodiments, the number of computations required by this one-cone method could be reduced by computing latitude and longitude bounds of the circular projection. Rather than checking every point, the method could iterate over all points in the spherical rectangle inside these bounds.

In the preferred embodiment of the one-cone method, the directionality to suspected sources is also calculated. Rather than having the operator interpret the peaks in the raw image, the instrument will display a horizontal azimuth and in some instances a vertical altitude for any or all suspected sources. These values can be calculated in several ways. A simple method is to sum along lines of altitude to determine the intensity versus the azimuth. Another approach is to identify peaks in the image and compute the centroid of each peak. Neither technique requires a large amount of computation.

In this preferred embodiment of the invention, in order to allow for frequent updating of the directionality display, a sliding-window buffer arrangement, in which individual cones are not immediately discarded, but rather remain for a preselected period of time, allows for various cone images to be compared and allows for the directionality of the source to be continually updated. The method could also be used in conjunction with an accelerometer to detect when the operator is moving, and discard sequences more rapidly in that case.

In addition to this one-cone method, a second method has also been developed which provides directionality information more directly and is computationally more efficient. In the method the intersection points between two Compton cones and the unit sphere are calculated. This approach eliminates the need to trace individual cones onto the sphere.

Figure 3:
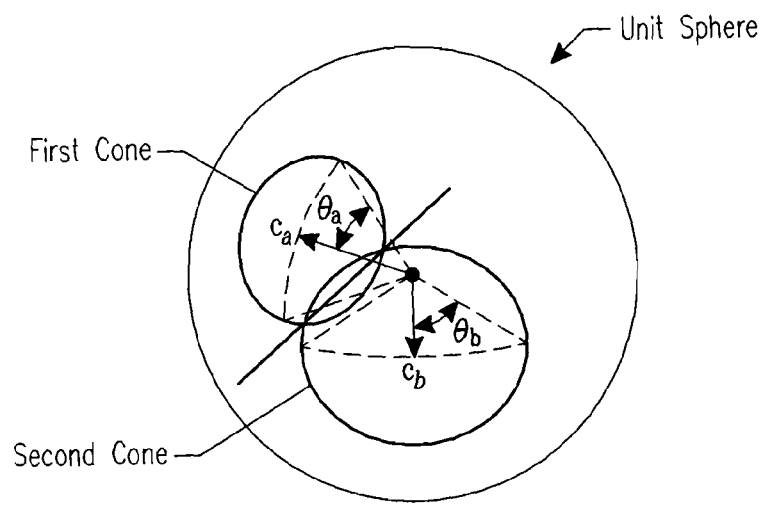
FIG. 3 is a view of the two cone method embodiment of the present invention.

Rather than iterating over points on the unit sphere, the two-cone algorithm iterates over the last m sequences captured by the detector. Referring now to FIG. 3, let $c_a$ and $\theta_a$ be the parameters of the Compton cone for one of the previous sequences, and let $c_b$ and $\theta_b$ be the corresponding parameters for the current sequence. Projecting these two cones onto the unit sphere might produce the result in FIG. 3. Assuming the two cones do not coincide, they mutually intersect the sphere at no more than two points. Now the intersection of the unit sphere with one Compton cone is equivalent to the intersection of the unit sphere with a certain plane. This plane is normal to the cone axis c, and located a distance $\cos \theta$ away from the origin. For two Compton cones, the corresponding planes will intersect in a line, if they intersect at all. The intersection of this line with the unit sphere equals the mutual intersection of the two Compton cones with the unit sphere.

The two-cone method begins with the equations of the two planes in point-normal form: $c_a \cdot u = \cos \theta_a$, $c_b \cdot u = \cos \theta_b$. Here u is an arbitrary position vector. All vectors are represented in Cartesian coordinates with x, y, and z components, so one could rewrite the equations above as:

$$c_{ax}u_x + c_{ay}u_y + c_{az}u_z = \cos \theta_a$$

$$c_{bx}u_x + c_{by}u_y + c_{bz}u_z = \cos \theta_b.$$

To determine the intersection line, the algorithm needs to find a point p that lies on both planes, and hence on the line. The simplest method is to solve the two equations in with the z-coordinate set to zero. Using Cramer's rule, $$p = \left( \frac{c_{by}\cos\theta_a - c_{ay}\cos\theta_b}{c_{ax}c_{by} - c_{ay}c_{bx}}, \frac{c_{ax}\cos\theta_b - c_{bx}\cos\theta_a}{c_{ax}c_{by} - c_{ay}c_{bx}}, 0 \right).$$

The notation $c_{ax}$ refers to the x-component of vector $c_a$. Given p, the method can determine the direction L of the intersection line by taking the cross product $c_a \times c_b$:

$$L = c_{ay}c_{bz} - c_{az}c_{by}, c_{az}c_{bx} - c_{ax}c_{bz}, c_{ax}c_{by} - c_{ay}c_{bx}).$$

Then the equation of the line is $u = \lambda L + p$, where $\lambda$ represents an arbitrary real number. Since the unit sphere is described by $u \cdot u = 1$, intersecting the line with the sphere produces $$(\lambda L + p) \cdot (\lambda L + p) = 1,$$

which expands to the quadratic equation $$(L \cdot L)\lambda^2 + 2(L \cdot p)\lambda + (p \cdot p) - 1 = 0.$$

Solving this equation for $\lambda$ using the quadratic formula and substituting back into $u = \lambda L + p$ yields the desired intersection points:

$$u = \frac{-(L \cdot p) \pm \sqrt{(L \cdot p)^2 - (L \cdot L)(p \cdot p - 1)}}{(L \cdot L)} L + p.$$

These points are then recorded in a buffer and then the process is repeated for another previous sequence, again determining its intersection points with the last-measured sequence.

A direct implementation of the two-cone method could be used, for example, to compute the intersection points for all possible pairs of Compton cones. If the detector stored m valid sequences in memory, the two-cone algorithm would intersect $m(m+1)/2$ pairs of cones in the worst case. Each pair of cones would produce zero or two intersection points (disregarding the cases where both cones coincide or intersect the sphere at the same point). However, sequences that have different incident energies $E_0$ are less likely to come from the same source than sequences with similar incident energies. The intersection points between cones from different sources would only add unnecessary clutter to the result. Thus, our implementation of the two-cone algorithm only intersects cones whose incident energies differ at most by a fixed percentage $\epsilon$.

This two cone method in particular reduces the total computational effort, while improving the ability of a user to locate weak sources in the presence of background. It has been generally demonstrated that the best results occur when the energy spectrum has definite full-energy peaks. One could extend this approach to intersect cones with energies that correspond to full-energy peaks of the same isotope, full-energy peaks of the same decay chain, or other criteria as defined by the particular desired application. In some applications, the cones of the various articles may be selected by characteristics such as observed energy or selection of the energies from a list of radioisotopes.

The two-cone algorithm offers a number of ways to compute directionality. In one embodiment, each intersection point could be plotted on a spherical surface a direction histogram is created and the same peak-finding techniques as the one-cone method can be utilized to image the energy source. In another embodiment, the intersection points could be grouped into clusters and the centroid of each cluster determined. This method would bypass the imaging step. In yet another embodiment, the horizontal bearing of each intersection point can be computed. The system would then display the directions that corresponded to the most points.

Figure 4:
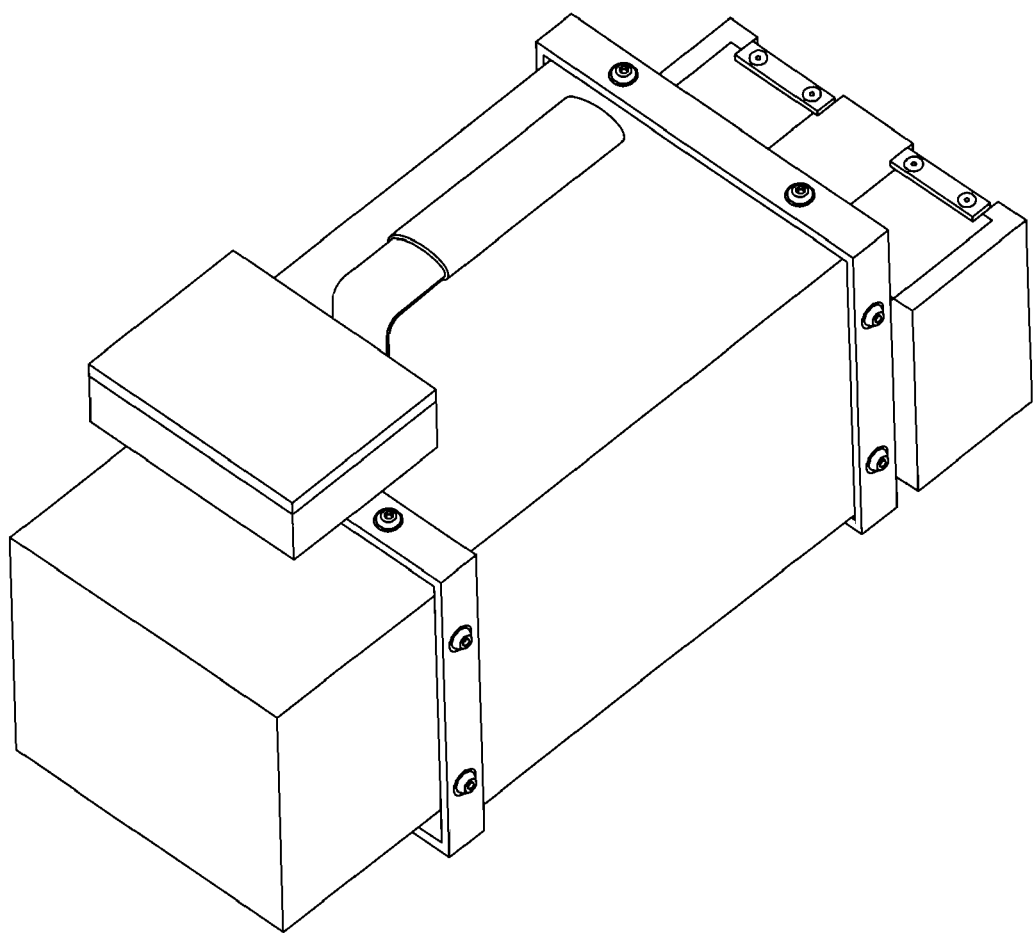
FIG. 4 is a perspective view of a portable radiation detector of the present invention.

In one embodiment of the present invention the methods are implemented through a handheld radioisotope identifier device, such as the device shown in FIG. 4. In this preferred embodiment of the invention a CdZnTe detector array measures the energy and direction of incoming gamma rays from 50 keV to 3 MeV. This device includes 18 CdZnTe crystals arranged in a two-level 3×3 array. Each crystal is 15×15×10 mm$^3$ and features an 11×11 anode grid that provides position sensitivity in two dimensions. The third coordinate is determined by measuring the time difference between the anode and cathode pulses as described above. The detector pitch is 22 mm laterally with a 20-mmmm spacing between layers to accommodate the readout electronics. This arrangement provides for 40.5 cm$^3$ of active detector volume. The outputs of each crystal are preprocessed by a specialized ASIC, converted to digital form, and loaded onto an embedded computing platform for further processing. The embedded computing platform combines a microprocessor with a field-programmable gate array (FPGA) that implements two key functions: identifying key isotopes present in the vicinity, and indicating the origin of the detected gamma rays. The handheld device also includes an LCD display, user inputs, and two Li-ion batteries that supply power.

In general, handheld radiation detection devices must perform several tasks in order to indicate the origin of detected gamma rays. These tasks include, but are not limited to, energy correction and discrimination, sequence order reconstruction, Compton imaging, and directionality calculation. In order for the results from these calculations to be effective, these tasks typically need to run at or near real time. However, because of size, weight, and portability considerations, handheld devices generally must rely on battery power when operating in the field and thus typically have limited computational capacity. Hence, it is generally desirable to offload the most computationally intensive tasks onto the FPGA. This objective in turn drives the need for energy correction, sequence order reconstruction, Compton imaging, and directionality calculation methods that have an efficient FPGA implementation, such as those within the scope of this invention.

In one implementation of the present invention, the method of the present invention was incorporated into an operating code that directed a typical desktop computer to perform the steps described above. These tests showed that the methods could provide useful information in much less time than prior art imaging methods. In addition the methods of the present invention have also been incorporated into a handheld CZT device such as the one shown in FIG. 4, which has been discussed previously. In addition to these descriptions a variety of other types of "systems" may be employed that utilize the methods described herein.

While various preferred embodiments of the invention are shown and described, it is to be distinctly understood that this invention is not limited thereto but may be variously embodied to practice within the scope of the following claims. From the foregoing description, it will be apparent that various changes may be made without departing from the spirit and scope of the invention as defined by the following claims.

What is claimed is:

1. A method for imaging and/or locating a radiation source, said method comprising the steps of
recognizing an interaction between a radiation emission and a sensor;
converting a parameter of said radiation emission into digital form;
calculating a Compton cone from a parameter of said radiation emission;
tracing at least one individual Compton cone on to a unit sphere having preselected characteristics by plotting a plurality of points on the sphere, each point evaluated by the equation $$\{c \cdot s \leq \cos \theta \cos \delta + \sin \theta \sin \delta \text{ OR } \cos \theta \geq \cos \delta\} \text{ AND}$$
$$\{c \cdot s \geq \cos \theta \cos \delta - \sin \theta \sin \delta \text{ OR } \cos \theta \leq -\cos \delta\}$$

wherein c is the Compton cone axis direction vector, s is the vector from the center of the sphere to said point on the sphere, $\theta$ is the Compton scatter angle, and $\delta$ is the estimated angular uncertainty;
computing a result indicative of a preselected characteristic of said radiation source; and
outputting said result.

2. The method of claim 1 wherein $\theta$ falls within the range between 0 and $\pi$, inclusive, and $\delta$ falls within the range between 0 and $\pi/2$, inclusive.

3. The method of claim 2 wherein $\delta$ is a constant,

4. The method of claim 1 further comprising the step of constructing a direction histogram from the points on the sphere, 5. The method of claim 4 further comprising the step of reducing the direction histogram in at least one dimension so as to estimate the direction to a source.

6. A method for imaging and/or locating a radiation source comprising the steps of:
recognizing an interaction between a radiation emission and a sensor;
converting a parameter of said radiation emission into digital form;
calculating a first Compton cone from a parameter of a first radiation emission;
calculating a second Compton cone from a parameter of a second radiation emission; and
intersecting said first and second Compton cones with an image surface to obtain at least one intersection point;
iterating said east one intersection point over a preselected number of prior first second Compton cones; computing a result indicative of a preselected characteristic of said radiation source; and
outputting said result.

7. The method of claim 6 where the image surface is a sphere.

8. The method of claim 6 further comprising the step of preselecting cones based upon energies observed.

9. The method of claim 6 further comprising the step of preselecting cones based upon energies from a list of radioisotopes.

10. The method of claim 6 further comprising the step of constructing a direction histogram from the intersection points.

11. A device comprising a field programmable gate array arrangement that performs Compton cone imaging by tracing at least one individual Compton cone on to a unit sphere having preselected characteristics by plotting a plurality of points on the sphere, each point evaluated by the equation $$\{c \cdot s \leq \cos \theta \cos \delta + \sin \theta \sin \delta \text{ OR } \cos \theta \geq \cos \delta\} \text{ AND}$$
$$\{c \cdot s \geq \cos \theta \cos \delta - \sin \theta \sin \delta \text{ OR } \cos \theta \leq -\cos \delta\}$$

wherein c is the Compton cone axis direction vector, s is the vector from the center of the sphere to said point on the sphere, $\theta$ is the Compton scatter angle, and $\delta$ is the estimated angular uncertainty.

12. A device comprising a computer readable medium that performs Compton cone imaging by
calculating a first Compton cone from a first parameter of a first occurrence,
calculating a second Compton cone from a second parameter of a second occurrence;
intersecting said first and second Compton cones with an image surface to obtain at least one intersection point; and
constructing a direction histogram from the intersection points.

* * * * *

UNITED STATES PATENT AND TRADEMARK OFFICE
CERTIFICATE OF CORRECTION

| | | |
|---|---|---|
| PATENT NO. | : 7,928,399 B2 | |
| APPLICATION NO. | : 12/518964 | |
| DATED | : April 19, 2011 | |
| INVENTOR(S) | : Mitchell J. Myjak, Carolyn E. Seifert and Scott J. Morris | |

It is certified that error appears in the above-identified patent and that said Letters Patent is hereby corrected as shown below:

Column 6 Row 21: Insert a space after 0,

Column 10 Row 15 Claim 6: Replace "east" with "at least"

Signed and Sealed this
Fourteenth Day of June, 2011

David J. Kappos
*Director of the United States Patent and Trademark Office*